(12) United States Patent
Mueller et al.

(10) Patent No.: US 8,187,010 B2
(45) Date of Patent: May 29, 2012

(54) POWER SUPPLY SYSTEM AND ELECTRICAL PLUG CONNECTOR

(75) Inventors: Thomas Mueller, Zapfendorf (DE); Stefan Kadur, Schesslitz (DE)

(73) Assignee: Wieland Electric GmbH, Bamberg (DE)

( * ) Notice: Subject to any disclaimer, the term of this patent is extended or adjusted under 35 U.S.C. 154(b) by 0 days.

(21) Appl. No.: 12/854,259

(22) Filed: Aug. 11, 2010

(65) Prior Publication Data

US 2011/0039432 A1 Feb. 17, 2011

(30) Foreign Application Priority Data

Aug. 11, 2009 (DE) .................... 20 2009 010 869 U

(51) Int. Cl.
*H01R 25/00* (2006.01)
(52) U.S. Cl. ........................................ 439/116; 439/110
(58) Field of Classification Search .................. 439/116, 439/110, 119, 117, 419
See application file for complete search history.

(56) References Cited

U.S. PATENT DOCUMENTS

| | | | | |
|---|---|---|---|---|
| 3,214,579 A | * | 10/1965 | Pacini | 362/227 |
| 5,295,055 A | * | 3/1994 | Brock et al. | 362/249.08 |
| 6,116,944 A | * | 9/2000 | Tseng | 439/419 |
| 6,328,593 B1 | * | 12/2001 | Chang et al. | 439/419 |
| 6,716,042 B2 | * | 4/2004 | Lin | 439/110 |
| 7,070,443 B2 | * | 7/2006 | Tashiro et al. | 439/419 |
| 7,217,012 B2 | * | 5/2007 | Southard et al. | 362/391 |
| 7,467,888 B2 | * | 12/2008 | Fiene | 362/640 |
| 7,520,763 B1 | * | 4/2009 | Buse | 439/121 |
| 7,611,376 B2 | * | 11/2009 | Daily et al. | 439/419 |
| 2007/0218753 A1 | * | 9/2007 | Tsai | 439/419 |
| 2009/0130889 A1 | * | 5/2009 | Daily et al. | 439/345 |

* cited by examiner

*Primary Examiner* — Hae Moon Hyeon
(74) *Attorney, Agent, or Firm* — Laurence A. Greenberg; Werner H. Stemer; Ralph E. Locher

(57) ABSTRACT

A power supply system for the internal power supply of a supporting mast of a wind power installation is provided in order to assist the work of servicing personnel in the wind power installation. The power supply system includes a power bus line, at least one tap on the power bus line for tapping off an electrical potential, and an electrical appliance connected to the tap. The electrical appliance is both electrically connected and mechanically adapted to the tap. An electrical plug connector is also provided.

14 Claims, 3 Drawing Sheets

POWER SUPPLY SYSTEM AND ELECTRICAL PLUG CONNECTOR

CROSS-REFERENCE TO RELATED APPLICATION

This application claims the priority, under 35 U.S.C. §119, of German Patent Application DE 20 2009 010 869.4, filed Aug. 11, 2009; the prior application is herewith incorporated by reference in its entirety.

BACKGROUND OF THE INVENTION

Field of the Invention

The invention relates to a power supply system for the internal power supply to a supporting mast of a wind power installation. The power supply system includes a power bus line, at least one tap on the power bus line for tapping off an electrical potential and an electrical appliance connected to the tap. The invention also relates to an electrical plug connector.

The supporting mast of a wind power installation, which is referred to as a mast in the following text for simplicity, has a heavy pod with rotor blades fitted thereto and is a component that is subject to heavy loads. The mast has to reliably withstand oscillations of the pod and wind forces that occur, in all operating conditions. The mast is in the form of a hollow tubular tower and is formed of a plurality of cylindrical tubular sections. The ends of the individual tubular sections, which are in the form of flanges, have screw connections which must regularly be checked because the rotational movement of the rotor blades results in considerable oscillations being transmitted to the tubular tower. In order to do that, servicing personnel enter the interior of the tubular tower. A suitable power supply system is provided over the entire height of the tubular tower, within the tubular tower, in particular for supplying power to internal lighting in the tubular tower.

SUMMARY OF THE INVENTION

It is accordingly an object of the invention to provide an optimized power supply system for a supporting mast of a wind power installation and an electrical plug connector, which overcome the hereinafore-mentioned disadvantages of the heretofore-known devices of this general type and which simplify the work of servicing personnel.

With the foregoing and other objects in view there is provided, in accordance with the invention, a power supply system for internal power supply to a supporting mast of a wind power installation. The power supply system comprises a power bus line, at least one tap disposed on the power bus line for tapping off an electrical potential, and an electrical appliance connected to the tap, the electrical appliance being both electrically connected and mechanically adapted to the tap.

The power supply system does not relate to tapping off the power generated by the rotor in the wind power installation, but primarily to the power supply to the interior of the supporting mast in order to assist maintenance of the wind power installation. The power bus line is provided for this purpose and extends over the length of the entire supporting mast, in such a way that electrical power is available at every desired height. At least one tap is provided on the power bus line, through the use of which the electrical potential on the power bus line is tapped off, in such a way that electrical power is fed into the electrical appliance.

The electrical appliance in this case is both electrically connected and mechanically adapted to the tap. This means that the electrical appliance is mechanically and in particular disconnectedly coupled to the tap through a form-locking or force-locking connection, for example by a latching or snap-action connection, or by plugging on. A form-locking connection is one which connects two elements together due to the shape of the elements themselves, as opposed to a force-locking connection, which locks the elements together by force external to the elements. The connection of the electrical appliance to the tap therefore fulfills two functions—on one hand the electrical appliance is supplied with electrical power from the power bus line, and on the other hand it is mechanically fixed to the power bus line, in such a way that its position is defined. The major advantage of the power supply system is the high degree of flexibility for connection of the electrical appliance: the electrical appliance is fixed by the tap at any desired point along the power bus line, and is available where it is required.

In accordance with another feature of the invention, a lower plug connector part is provided as the tap, with connecting contacts for making contact with the power bus line and with plug and/or socket contacts as a connection to the electrical appliance. In particular, this is the lower plug connector part of a heavy industrial plug connector. Heavy industrial plug connectors are plug connectors which are specifically constructed for use in particularly severe environments. Heavy industrial plug connectors are defined, for example, by the class according to IEC 60603-7-3. A plug connector generally includes a lower plug connector part and an upper plug connector part, which can be plugged onto it. The lower plug connector part has plug or socket contacts which form a contact insert for making the electrical connection to the upper plug connector part that is plugged onto it. It is precisely these plug or socket contacts which are used to make contact with the electrical appliance, which has a corresponding contact insert. The advantage in this case is that even already existing upper plug connector parts of industrial plug connectors can be used for the power supply system, and no structural changes are required to the lower plug connector parts.

In accordance with a further feature of the invention, a groove is provided which is formed on the lower surface, facing the power bus line in the final assembled state, of the lower plug connector part and which can be placed over the power bus line with penetration contacts, which project from the groove base for making an insulation-displacement terminal contact with the power bus line. The penetration contacts are, for example, lances, points or sharp edges, which penetrate the insulation of the power bus line and make contact with the conductor. This results in the lower plug connector part being fitted easily and quickly to the power bus line, with the contact being made between the lower plug connector part and the power bus line without having to strip insulation off the power bus line.

In accordance with an added feature of the invention, expediently, at least one and preferably two latching hooks is or are provided, which can pivot and are disposed at the ends of the lower plug connector part, for mechanically fixing the upper plug connector part on the lower plug connector part. The latching hook allows the upper plug connector part to be securely latched to the lower plug connector part.

In accordance with an additional feature of the invention, the electrical appliance and the upper plug connector part are advantageously formed integrally or in one piece. The electrical appliance, which in this case is a power end user, is an integral component of the upper plug connector part in this case as a result of which they form a unit. The electrical appliance therefore does not need to be connected to the upper plug connector part on site, but the two are joined together at an earlier time and are stored, and transported to the point of use, as a unit. The connection between the upper plug connector part and the electrical appliance in this case is preferably detachable, for example with the electrical appliance being plugged onto the upper plug connector part in such a way that the electrical appliance can easily be replaced in the event of malfunctions.

In accordance with yet another feature of the invention, a further advantage is that a light element, in particular an LED (light-emitting diode) light, is used as the electrical appliance. Three light elements are expediently provided per upper plug connector part in this case. In particular, the lights are fitted at a plurality of points over the length of the power bus line and simplify the maintenance work in the tower because the entire tower is illuminated in this way and, in particular, no further light sources, or only a very small number of further light sources, are required. LED lights in this case represent a preferred embodiment of the light elements, since they have a very long life. They therefore reduce the operating and maintenance costs, require only low operating voltages, and are extremely insensitive. However, the power supply system is not restricted to the use of lights. As an alternative to the lights, it is also possible to connect other electrical appliances, such as plug sockets, to the tap.

In accordance with yet a further preferred feature of the invention, the supporting mast is a tubular tower composed of a plurality of tubular sections, and each tubular section has at least one uncut power bus section element, which is matched to its respective tube length, in such a way that the power bus line is composed of the respective power bus section elements of the individual tubular sections fitted to one another. The lengths of the tubular sections may differ considerably. In addition, so-called fall-prevention bulkheads are normally used, in order to catch someone who is falling down if they fall. There is therefore a very low level of prefabrication in the construction of the supporting mast. The advantage of the described power bus line is that it is produced as an effectively endless line and is subsequently cut to size, to match the length of the tubular sections. The power bus line is uncut in each of the tubular sections. The individual power bus section elements are individually cut to size only when the power supply system is being installed in the wind power installation, with the taps having the electrical appliances being placed on the power bus line. In order to pass the power bus line through the fall-protection bulkhead, the individual power bus section elements are preferably connected to one another at their ends, through industrial plug connectors.

In accordance with yet an added feature of the invention, the connection of the electrical appliances to the power bus line is additionally simplified by the power bus line being prefabricated with a plurality of taps which, in particular, are fitted at the same intervals. For example, the taps are separated from one another by intervals of a few tens of centimeters, in particular intervals of 30 to 80 cm. When the power supply system is being installed, the prefabricated power bus section elements are cut to size, and the electrical appliances are connected at selected points to the taps which have already been provided on the power bus section elements.

In accordance with yet an additional feature of the invention, a battery for supplying emergency power to the electrical appliance is provided in case there is a malfunction in the power supply system. This ensures that the electrical appliance is supplied with electrical power at all times, and is therefore fully functional.

With the objects of the invention in view, there is concomitantly provided an electrical plug connector, comprising a lower plug connector part with connecting contacts for making contact with a power bus line, and an upper plug connector part with at least one and preferably three integrated light elements.

The plug connector, which forms a tap, is electrically connected to a power bus line through the connecting contacts of the lower plug connector part, in particular through the use of a penetration contact, with the lower plug connector part also being mechanically fixed in this way. The upper plug connector part with the light elements in this case forms a functional assembly, which is supplied with power through the use of the tap. When the upper plug connector part is fitted, the light elements are supplied with electrical power, and are switched on. In this case, the light elements are preferably semi-mounted light elements and can be plugged on and unplugged individually. In addition, a so-called CEE plug socket, a normal 230 V plug socket or a maintenance switch, for example, can be used as a functional assembly.

Other features which are considered as characteristic for the invention are set forth in the appended claims.

Although the invention is illustrated and described herein as embodied in a power supply system and an electrical plug connector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
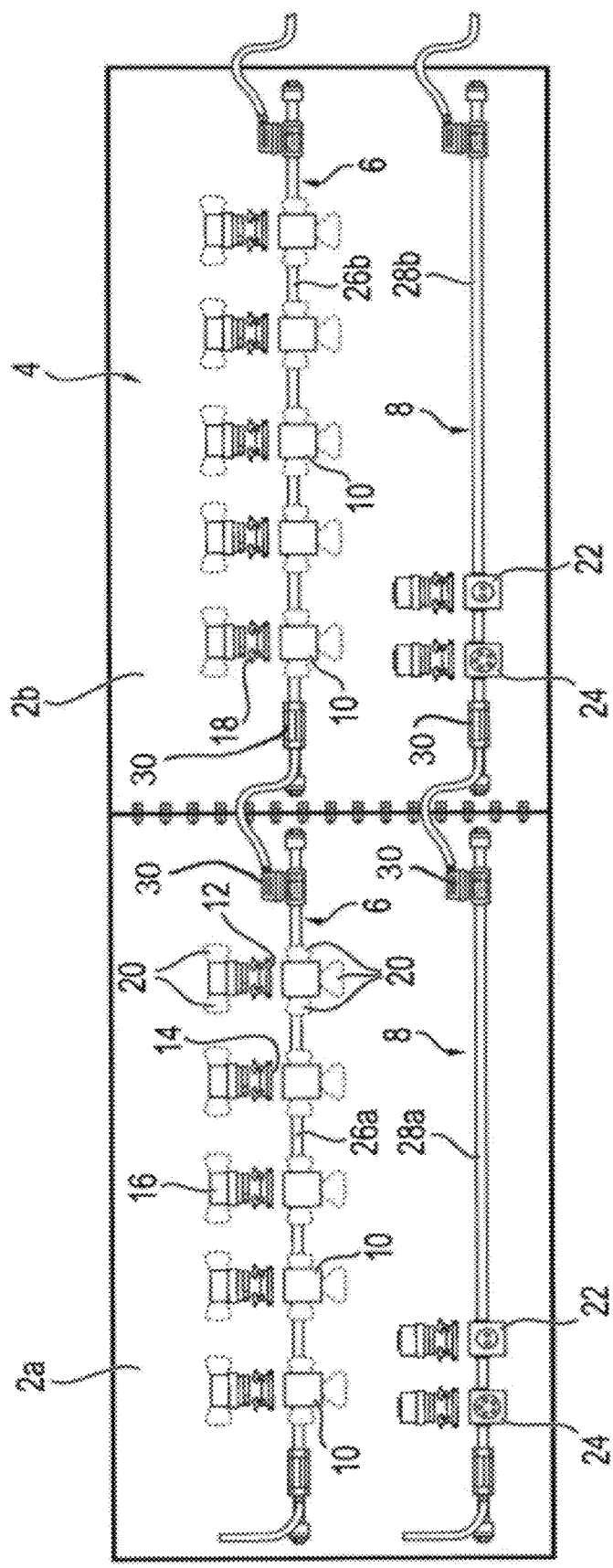
FIG. 1 is a diagrammatic, side-elevational view of an exemplary embodiment of part of a power supply system according to the invention disposed on an inner wall surface of a supporting mast.
Figure 2:
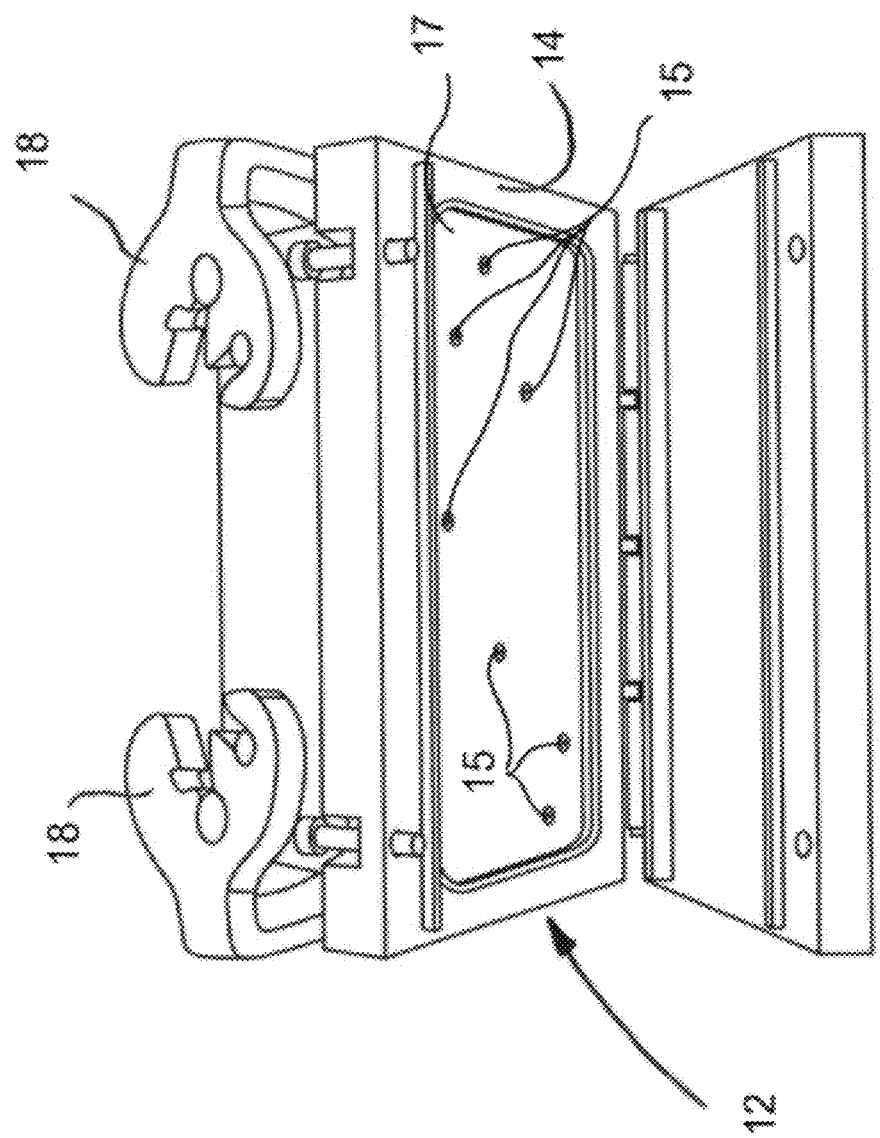
FIG. 2 shows a plug connector lower part in accordance with one particular embodiment of the invention.
Figure 3:
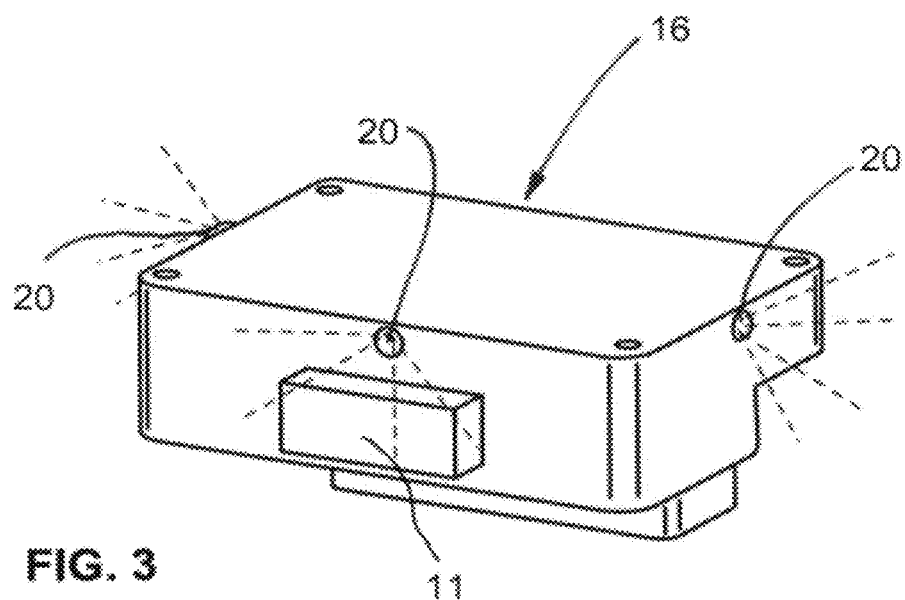
FIG. 3 shows a plug connector upper part in accordance with one particular embodiment of the invention.
Figure 4:
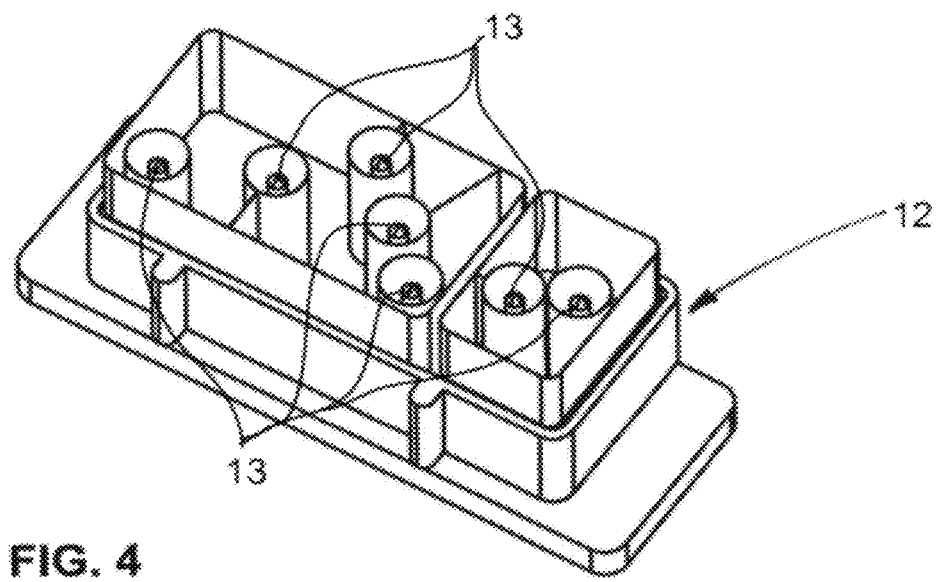
FIG. 4 is a surface view of the plug connector lower part of FIG. 2.

Referring now in detail to the figures of the drawing, there is seen a subarea of an inner wall surface of two segments 2a, 2b. The segments 2a, 2b form two tubular sections of a supporting mast of a wind power installation, which is not shown in any greater detail. A power supply system 4 for the wind power installation runs along the inner wall surface of the segments 2a, 2b and includes two parallel power bus lines 6, 8 which extend over an entire height of the supporting mast.

The first power bus line 6 is in the form of a ribbon cable, over the length of which a plurality of modules 10 are disposed in distributed form, as illustrated in the form of blocks. Furthermore, the modules 10 are shown in the form of a side view, toward the side of the two power bus lines 6, 8.

The modules 10 of the first power bus line 6 include a tap 12 for tapping off an electrical potential. The tap 12 is formed by a lower plug connector part of an industrial plug connector.

Penetration contacts 15 for making an insulation-displacement terminal contact with the power bus line 6 are formed on a lower surface 14 of the lower plug connector part 12, which faces the power bus line 6 in a final assembled state. The penetration contacts 15 are disposed in a groove 17 which can be placed over the power bus line 6 but is not shown in any greater detail. The lower plug connector part 12 has plug contacts 13 on its opposite surface for connection of an electrical appliance. In addition, the lower plug connector part 12 has two latching hooks 18 for locking an upper plug connector part 16.

Each of the modules 10 is therefore an industrial plug connector. The lower plug connector part of a known industrial plug connector 10 is therefore used as the tap 12.

In the illustrated exemplary embodiment, each electrical appliance is formed of three light elements 20, which are integrated in or formed in one piece with the upper plug connector part 16. The three light elements 20 are indicated by their light radiation. The three light elements 20 are LED lights, which are plugged onto the upper plug connector part 16 and form an integral component of the upper plug connector part 16. In this case, the LED lights 20 are fixed on the power bus line 6, and are supplied with power from the power bus line 6, by plugging and locking the upper plug connector part 16 to the lower plug connector part 12. A battery 11 is optionally integrated to provide an emergency power supply for the LED lights 20. The modular construction of the industrial plug connectors 10 allows the upper plug connector parts 16 to be replaced quickly with the LED lights 20 or individual LED lights, without having to disconnect the other industrial plug connectors 10 from the power supply system.

It is also possible to connect other electrical appliances to the power bus lines 6, 8, instead of the LED lights 20. This is illustrated, by way of example, on the basis of the power bus line 8. In this case, the power bus line 8 is a heavy-current line, to which 2-pole maintenance plug sockets 22 and 5-pole maintenance plug sockets 24 are connected through the taps 12.

The power bus lines 6, 8 include a plurality of power bus section elements 26a, 26b and 28a, 28b, which are cut to match the respective length of the segments 2a, 2b. However, the power bus section elements 26a, 26b, 28a, 28b are uncut within the segments 2a, 2b. Before installation of the power supply system 4, the power bus lines 6, 8 have an "infinite length" so to speak, and are cut to size, corresponding to the length of the supporting mast segments. The individual modules 10 are then individually attached to the power bus section elements 26a, 26b, 28a, 28b, at the points where they are required. The power bus section elements 26a, 26b, 28a, 28b are connected to one another through further industrial plug connectors 30 in boundary areas of the segments 2a, 2b.

The invention claimed is:

1. A power supply system for internal power supply to a supporting mast of a wind power installation, the power supply system comprising:
    a power bus line;
    at least one tap disposed on said power bus line for tapping off an electrical potential;
    an electrical appliance connected to said tap, said electrical appliance being both electrically connected and mechanically coupled to said tap; and
    a lower plug connector part of an industrial plug connector used as said tap, said tap including:
        connecting contacts for contacting the power bus line, and
        at least one of plug contacts and socket contacts as a connection to the electrical appliance.

2. The power supply system according to claim 1, wherein:
    in an assembled state of said lower plug connector part, said lower plug connector part includes a groove formed on a lower surface facing said power bus line;
    said groove configured for placement over said power bus line;
    said at least one of plug contacts and socket contacts arranged on the base of said groove and configured to contact the power bus line; and
    said at least one of plug contacts and socket contacts designed as penetration contacts projecting from base of said groove for making an insulation-displacement terminal contact with said power bus line.

3. The power supply system according to claim 1, which further comprises an upper plug connector part, and at least one pivotable latching hook disposed at least at one end of said lower plug connector part for mechanically fixing said upper plug connector part on said lower plug connector part.

4. The power supply system according to claim 3, wherein said electrical appliance and said upper plug connector part are formed integrally.

5. The power supply system according to claim 3, wherein said electrical appliance and said upper plug connector part are formed as one piece.

6. The power supply system according to claim 4, wherein said electrical appliance is a light element.

7. The power supply system according to claim 4, wherein said electrical appliance is an LED (light-emitting diode) light.

8. The power supply system according to claim 4, wherein said electrical appliance includes three light elements integral with said upper plug connector part.

9. The power supply system according to claim 1, wherein:
    the supporting mast is a tubular tower with a plurality of individual tubular sections each having a respective tube length;
    said power bus line includes at least one uncut power bus section element being matched to the respective tube length in each of the individual tubular sections; and
    said power bus line is formed of said respective power bus section elements fitted to one another in the individual tubular sections.

10. The power supply system according to claim 9, which further comprises industrial plug connectors connecting said power bus section elements to one another.

11. The power supply system according to claim 1, wherein said power bus line is prefabricated with a plurality of said taps.

12. The power supply system according to claim 11, wherein said plurality of taps are fitted at equal intervals.

13. The power supply system according to claim 1, which further comprises a battery included in said electrical appliance for supplying emergency power to said electrical appliance.

14. An industrial electrical plug connector, comprising:
    a lower plug connector part of the plug connector used as a tap, said tap including:
        connecting contacts for contacting a power bus line, and
        at least one of plug contacts and socket contacts as a connection to an electrical appliance;
    an upper plug connector part with at least one integrated light element; and
    said lower plug connector part and said upper plug connector part connected to one another by at least one of plug contacts and socket contacts.

* * * * *